H. L. FORESMAN.
SOLAR HEATER.
APPLICATION FILED MAY 17, 1913.
1,093,925.
Patented Apr. 21, 1914.
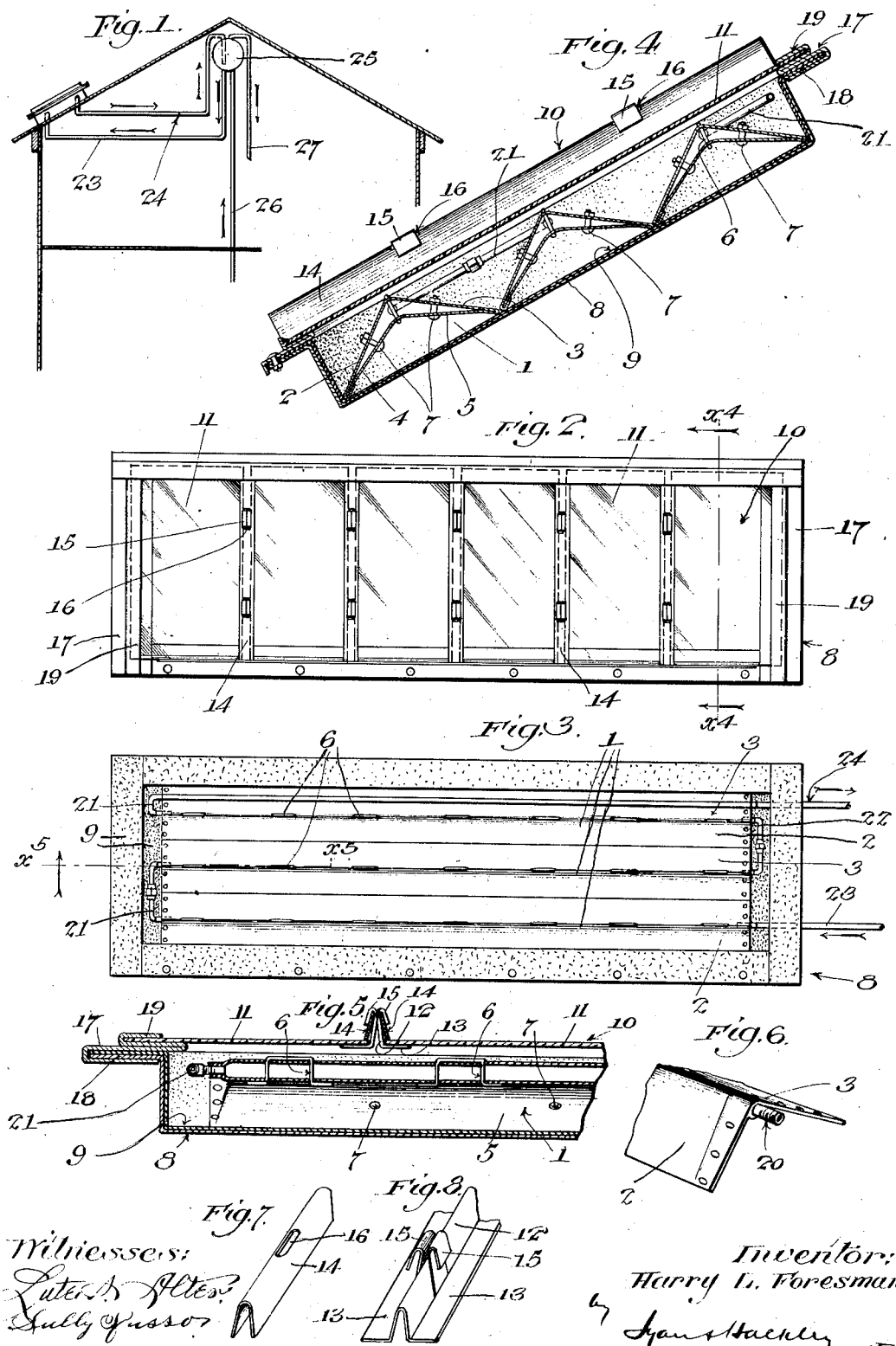
Inventor:
Harry L. Foresman

UNITED STATES PATENT OFFICE.

HARRY L. FORESMAN, OF SAN DIMAS, CALIFORNIA.

SOLAR HEATER.

1,093,925.  Specification of Letters Patent.  Patented Apr. 21, 1914.

Application filed May 17, 1913. Serial No. 768,348.

*To all whom it may concern:*

Be it known that I, HARRY L. FORESMAN, a citizen of the United States, residing at San Dimas, in the county of Los Angeles and State of California, have invented a new and useful Solar Heater, of which the following is a specification.

This invention relates to solar heaters for domestic or other uses, and the object of the invention is to provide a construction which is efficient, durable in use, of economical construction, and which will be very effective in heating the water.

Referring to the drawings: Figure 1 is a vertical section through a building, showing diagrammatically, one manner of installing the heater. Fig. 2 is a plan view of the heater. Fig. 3 is a plan view of the heater with the transparent cover removed. Fig. 4 is an enlarged section on line $x^4$—$x^4$, Fig. 2, showing the heater as tilted when installed, for use. Fig. 5 is an enlarged section on line $x^5$—$x^5$, Fig. 3. Fig. 6 is a perspective view of the end of one of the heating units. Fig. 7 is a perspective of the end of a retaining bar. Fig. 8 is a perspective of the end of a supporting bar.

The heater consists of one or more heating units 1, each heating unit being composed preferably of a single piece of plate or sheet metal which is bent to form an upper member comprising two upper surfaces 2 and 3 extending at an angle to each other, in the form of an inverted V, and a lower member comprising two lower surfaces 4 and 5 extending at an angle to each other in the form of an inverted V, and extending within the V-shaped surfaces 2 and 3 of the upper member, said upper and lower members being spaced apart by copper wires 6, the latter being extended through the plates and also helping to conduct heat to the water which is contained within the unit. To further stiffen the plates I may employ bolts 7 as indicated in Fig. 4. All seams and crevices are soldered or otherwise closed to prevent leakage of water. The units are arranged within a box 8, the latter having a non heat conducting lining 9 formed of felt or other preferred material to retain as much heat as possible within the box and cause it to be given to the heating units after the sun has set. This felt may be secured in any desired manner. The top of the box 8 is closed by a transparent cover 10 which consists of a series of glass plates 11 which are laid on transverse supports 12. Each support 12 comprises a metal plate with inverted V-cross section with horizontal flanges 13 upon which flanges the glass plates 11 rest. In order to retain the glass plates upon the flanges 13, retaining bars 14 are employed, each of which is an inverted V in cross section and which nests over the associated supporting bar 12. Hooks 15 on the bar 12 project through slots 16 in the retaining bars 14 and are bent down outside the retaining bar and secure the retaining bar in position, which holds the glass plates in place. The supporting bars are secured to a frame 17, the ends of which are turned over flanges 18 on the box 8, and the ends of the frame 17 are also turned over at 19 to secure the edges of the glass plates 11, putty or felt lining making it waterproof.

In each end of each unit is a nipple 20. Where several units are employed in one heater, as shown in the present drawings, they may be arranged as indicated in Fig. 4, with their bottom edges resting upon the bottom of the box, the units being parallel with each other and their nipples connected by pipes 21 at one end and by pipes 22 at the other end, these pipes being provided with unions, as shown, so as to permit of separation of the units when desired. A pipe 23 serves to conduct water to the lower unit and a pipe 24 conducts the heated water from the upper unit to the bottom of a storage tank 25 which may be located at any desired point, as for example, in an elevated position as indicated.

26 is a supply pipe which conducts cold water to the heater and which becomes thereby warmed to an extent before passing to the heater. 27 is the pipe conducting water from the storage tank to the place where it is to be used.

It will be understood that the heater may be connected in any desired way, but that as herein shown, there will be a circulation of the water from the heater to the storage tank 25 and thence back to the heater, with the result that the body of water within the tank 25 is kept at a high temperature.

By locating the units with their surfaces 2 and 3 in the angular position shown, these surfaces will receive the rays of the sun at angles more nearly perpendicular than if they were all on the same plane. That is to say, in the late afternoon sun, the surfaces 2 will receive these rays almost perpendicularly, while at such time the surfaces 3 will not receive such rays, while earlier in the day, the surfaces 3 will receive the rays in a direction nearly perpendicular to them. In addition to this, these surfaces when thus arranged present a greater area which is exposed to the sun.

The water in the heating units is heated from the top surfaces as stated, and it is also heated from the bottom surfaces, the hot air circulating in the spaces beneath the bent up bottom surfaces. The heat is also conducted to the water by the copper rivets or wires 6, and by the bolts 7.

What I claim is:

1. In a solar heater, a heating unit comprising a sheet metal upper member bent to form two surfaces extending at an angle to one another, in the form of an inverted V, and a sheet-metal lower member bent to form two lower surfaces extending in the form of an inverted V within the V-shaped upper member, end portions connecting said upper and lower members and forming therewith a closed chamber, and inlet and outlet means in said end portions.

2. In a solar heater, a heating unit comprising two outer plates at an angle to each other, two iner' plates at an angle to each other and separated from the outer plates to form a receptacle for water, means for the inlet and discharge of water, and U-shaped wires extending through said plates, the inner ends of the wires being bent to brace the plates, said wires also acting to conduct heat to the water within the unit.

3. In a solar heater, a series of heating units, each unit comprising a shallow box with its outer exposed surface in two planes at an angle to each other, a box inclosing said unit, a cover for said box comprising transverse supporting bars with horizontal flanges, glass plates resting on said flanges, and retaining bars with V-cross sections nesting on said supporting bars and retaining said glass plates.

4. In a solar heater, a series of heating units, each unit comprising a shallow box with its outer exposed surface in two planes at an angle to each other, a box inclosing said unit, a cover for said box comprising transverse supporting bars with horizontal flanges, glass plates resting on said flanges, retaining bars with V-cross sections nesting on said supporting bars and retaining said glass plates, and hooks on the supporting bars projecting up through slots in the retaining bars, and being bent over the retaining bars to secure them in position.

5. In a solar heater, a series of heating units, each unit comprising a shallow box with its outer exposed surface in two planes at an angle to each other, a box inclosing said unit, a cover for said box comprising transverse supporting bars with horizontal flanges, glass plates resting on said flanges, retaining bars with V-cross sections nesting on said supporting bars and retaining said glass plates, said box having flanges, and a frame with its edge portions folded over said box flanges, said frame also being folded over the outer glass edges.

In testimony whereof, I have hereunto set my hand at Los Angeles California this 9th day of May, 1913.

HARRY L. FORESMAN.

In presence of—
 GEORGE T. HACKLEY,
 LORA M. BOWERS.